(12) United States Patent
Gauss et al.

(10) Patent No.: US 11,067,309 B2
(45) Date of Patent: Jul. 20, 2021

(54) VENTILATOR UNIT

(71) Applicant: ZIEHL-ABEGG SE, Künzelsau (DE)

(72) Inventors: Tobias Gauss, Niedernhall (DE); Daniel Seifried, Schwäbisch-Hall (DE); Thomas Bitz, Künzelsau (DE)

(73) Assignee: ZIEHL-ABEGG SE, Künzelsau (DE)

( * ) Notice: Subject to any disclaimer, the term of this patent is extended or adjusted under 35 U.S.C. 154(b) by 978 days.

(21) Appl. No.: 15/616,953

(22) Filed: Jun. 8, 2017

(65) Prior Publication Data

US 2017/0356673 A1 Dec. 14, 2017

(30) Foreign Application Priority Data

Jun. 8, 2016 (DE) .................... 10 2016 007 205.9

(51) Int. Cl.
| | |
|---|---|
| *F04D 25/08* | (2006.01) |
| *F24F 13/08* | (2006.01) |
| *F04D 29/54* | (2006.01) |
| *F04D 29/70* | (2006.01) |
| *A01K 1/00* | (2006.01) |
| *F24F 13/20* | (2006.01) |

(52) U.S. Cl.
CPC ............ *F24F 13/08* (2013.01); *A01K 1/0052* (2013.01); *A01K 1/0064* (2013.01); *F04D 25/08* (2013.01); *F04D 29/544* (2013.01); *F04D 29/703* (2013.01); *F24F 13/20* (2013.01)

(58) Field of Classification Search
CPC .... F04D 19/002; F04D 29/544; F04D 29/703; F04D 25/08; F04D 25/088; F04D 25/10; F04D 25/105; F04D 19/00; F04D 29/54; A01K 1/0052; A01K 1/0064; F05D 2240/12; F24F 13/08; F24F 13/20
See application file for complete search history.

(56) References Cited

U.S. PATENT DOCUMENTS

| | | | | |
|---|---|---|---|---|
| 2,154,313 A | * | 4/1939 | McMahan | ............. F04D 29/541 415/210.1 |
| 3,173,604 A | * | 3/1965 | Sheets | ..................... F01D 5/142 415/218.1 |
| 3,883,264 A | * | 5/1975 | Rao | .......................... F01D 1/04 415/119 |

(Continued)

FOREIGN PATENT DOCUMENTS

| | | |
|---|---|---|
| DE | 20 2011 004 708 | 9/2011 |
| EP | 1 367 262 | 12/2003 |

(Continued)

*Primary Examiner* — Igor Kershteyn
*Assistant Examiner* — Joshua R Beebe
(74) *Attorney, Agent, or Firm* — Gudrun E. Huckett

(57) ABSTRACT

A ventilator unit has a ventilator housing and at least one ventilator accommodated in the ventilator housing. A first outlet guide apparatus is associated with the ventilator and is arranged in the ventilator housing, wherein the first outlet guide apparatus has first outlet guide vanes distributed circumferentially. A second outlet guide apparatus is correlated with the first outlet guide apparatus and arranged in a flow path of an air stream sucked in by the ventilator. The second outlet guide apparatus is connected to a protective screen. The second outlet guide apparatus has second outlet guide vanes. The second outlet guide apparatus increases the throw of the ventilator unit.

21 Claims, 18 Drawing Sheets

(56) References Cited

U.S. PATENT DOCUMENTS

| | | | | | |
|---|---|---|---|---|---|
| 4,473,000 | A | * | 9/1984 | Perkins | F04D 25/088 454/299 |
| 4,548,548 | A | * | 10/1985 | Gray, III | F01P 5/06 123/41.49 |
| 5,470,200 | A | * | 11/1995 | Tupov | F04D 29/661 415/194 |
| 6,173,506 | B1 | * | 1/2001 | Kruepke | A23N 12/083 34/225 |
| 6,386,828 | B1 | * | 5/2002 | Davis | A01K 1/0052 415/147 |
| 7,618,236 | B2 | * | 11/2009 | Hsu | F04D 29/542 415/121.2 |
| D703,310 | S | * | 4/2014 | Masciarella | D23/414 |
| 10,024,531 | B2 | * | 7/2018 | Avedon | F04D 25/088 |
| 2005/0202776 | A1 | * | 9/2005 | Avedon | F04D 29/547 454/230 |
| 2007/0116564 | A1 | * | 5/2007 | Hsu | F04D 29/667 415/211.2 |
| 2010/0266400 | A1 | * | 10/2010 | Avedon | F04D 25/088 415/209.3 |
| 2011/0030821 | A1 | * | 2/2011 | Merchant | F04D 29/548 137/565.01 |
| 2012/0039731 | A1 | | 2/2012 | Sadi et al. | |
| 2013/0011254 | A1 | * | 1/2013 | Avedon | F04D 29/444 415/221 |
| 2015/0176834 | A1 | * | 6/2015 | Avedon | F21V 29/677 415/121.3 |
| 2015/0300371 | A1 | * | 10/2015 | Mehlhorn | F04D 29/64 415/202 |
| 2015/0330411 | A1 | | 11/2015 | Heli | |
| 2016/0105996 | A1 | | 4/2016 | Schanzenbach et al. | |

FOREIGN PATENT DOCUMENTS

| | | | | |
|---|---|---|---|---|
| EP | 1367262 A2 | * | 12/2003 | F04D 29/542 |
| EP | 2 314 882 | | 4/2011 | |
| WO | 2007028910 | | 3/2007 | |
| WO | WO-2015138672 A1 | * | 9/2015 | F04D 25/08 |

* cited by examiner

VENTILATOR UNIT

BACKGROUND OF THE INVENTION

The invention concerns a ventilator unit with at least one ventilator which is accommodated in a housing in which an outlet guide apparatus associated with the ventilator is located that comprises outlet guide vanes distributed about the circumference.

In the food industry as well as in livestock breeding, ventilators with long throw are required in order to distribute the air uniformly in the room. Due to the ecodesign directive that is becoming more and more stringent (ErP directive 2009/125/EC), ventilators with special outlet guide wheels are used in order to increase the efficiency (US 2012/0039731 A1). However, the throw cannot be significantly increased with such special outlet guide wheels.

In order to increase the throw, usually outlet guide wheels are used that are produced by an injection molding process. By means of such an outlet guide wheel, the swirl can be reduced and the air stream can thus be directed axially. In this way, the throw is also increased. Each ventilator size requires its own outlet guide wheel which usually also fits only on one protective screen/support grid.

The outlet guide wheel is mounted in flow direction downstream of a protection against contact (EP 1 367 262 B1). The safety distance between the protection against contact and the ventilator is minimal in such ventilator units. Therefore, the ring distance of the protection against contact according to DIN EN ISO 13857 must be correspondingly small. However, due to the minimal ring distances, the efficiency of the ventilator unit drops in comparison to a ventilator unit with a protection against contact with greater ring distance. The minimal ring distance counteracts an increase of the throw.

The invention has the object to design the ventilator unit of the aforementioned kind such that with simple constructive measures the throw of the ventilator unit can be significantly increased.

SUMMARY OF THE INVENTION

This object is solved for the ventilator unit of the aforementioned kind in accordance with the invention in that an additional second outlet guide apparatus is correlated with the first outlet guide apparatus of the ventilator and is arranged in the flow path of the sucked-in air.

In the ventilator unit according to the invention, two outlet guide apparatus are provided wherein the additional second outlet guide apparatus is associated with the first outlet guide apparatus that is arranged within the ventilator housing. By means of the additional outlet guide apparatus, the throw of the ventilator unit according to the invention can be significantly increased. With the additional outlet guide apparatus, the requirements demanded by the ecodesign directive can be fulfilled without problem.

Advantageously, the additional outlet guide apparatus comprises additional outlet guide vanes with which, depending on the shape and/or arrangement, the throw of the ventilator unit can be adapted easily to the desired end use.

In an advantageous embodiment, the additional outlet guide apparatus is part of a protective screen with which the protection against contact at the ventilator unit is achieved. Since the additional outlet guide apparatus is a component of the protective screen, the additional outlet guide apparatus can be brought into its installation position in a simple way jointly with the attachment of the protective screen on the ventilator unit. By means of the protective screen provided with the second outlet guide apparatus, it is possible to retrofit existing ventilator units with the additional outlet guide apparatus. For the user, there is therefore the possibility to very simply retrofit existing ventilator units in such a way that the required long throws can be achieved with them.

In order to optimize the throw increase, it is advantageous when the additional outlet guide vanes are substantially arranged upright. Then, the additional outlet guide vanes are positioned in flow direction so that the air stream becomes substantially directed axially. This contributes to a long throw. An upright arrangement is to be understood such that the additional outlet guide vanes can be arranged not only perpendicular but also at a slant.

The additional outlet guide vanes can be comprised of sheet metal parts in a simple way. In this case, the outlet guide vanes can be produced, for example, by stamping but also by laser cutting and the like in a very simple and inexpensive way from sheet metal.

However, it is also possible to manufacture the additional outlet guide vanes of plastic material parts, in particular by an injection molding process.

A very simple and inexpensive embodiment results when the additional outlet guide vanes are planar. In this case, outlet guide vanes which have been separated or cut from sheet metal, for example, can be employed without further postprocessing or post-shaping immediately for use as an outlet guide vane.

However, it is also possible to design the additional outlet guide vanes so as to extend curved at least in the region of their leading edge which is facing the air stream. This provides the possibility of influencing the magnitude of the throw by appropriate shaping of the additional outlet guide vanes.

In a simple embodiment, the leading edge of the additional outlet guide vanes which is facing the air stream is extending straight.

It is moreover possible to design this leading edge of the additional outlet guide vanes which is facing the air stream so as to have a profile, for example, to be corrugated or serrated. Accordingly, not only by shaping the additional outlet guide vanes but also by a special configuration of the leading edge, the magnitude of the throw and the acoustics can be influenced. Depending on the configuration of the ventilator unit, the user or the manufacturer of the ventilator unit has therefore various parameters available for adjusting the desired throw for the envisioned end use.

A simple attachment of the additional outlet guide vanes results when they are arranged at least across a portion of their length on at least one rod-shaped support. However, they can also partially replace the rod-shaped support.

In an advantageous embodiment, the rod-shaped support is attached on the protective screen such that it connects coaxially extending rings of the protective screen with each other. The rod-shaped support thus serves not only for holding and fastening the additional outlet guide vanes but also for stabilizing the protective screen.

In a simple and advantageous embodiment, two additional outlet guide vanes which are positioned opposite each other are formed together as one piece. This has the advantage that two additional outlet guide vanes can be mounted at the same time in the same working step during manufacture.

Preferably, the additional outlet guide vanes which are positioned opposite each other in pairs are part of a flat strip in this case. It can be comprised of sheet metal but also of plastic material. When the strip is made of sheet metal, it can be inexpensively produced in a simple way from sheet metal by a stamping or a cutting process, in particular by a laser cutting process. The flat strip ensures a high stability and simple attachment of the additional outlet guide vanes.

When several strips are used, then these strips are advantageously connected to each other so as to cross each other at half the length. This can be achieved, for example, in that these strips at half the length have a transverse slot, respectively, by means of which the strips crossing each other can be put together with form fit.

By means of the number of the additional outlet guide vanes, the magnitude of the throw can be affected also. Thus, the manufacturer has available as a selection criterion not only the shape of the additional outlet guide vanes and/or the configuration of the leading edge as an adjustment criterion but also the number of additional outlet guide vanes. With appropriate adjustment of these different parameters, the desired optimal throw can be determined and adjusted for each ventilator unit.

When the additional outlet guide apparatus is a component of the protective screen, then it is advantageous when the strips extend across the entire width or the entire diameter of the protective screen. In this case, the strips also contribute to the stability of the protective screen.

In another advantageous embodiment, the additional outlet guide apparatus is formed by individual additional outlet guide vanes which are fastened on the outlet guide vanes provided in the ventilator housing. For example, the additional outlet guide vanes can be clipped onto these outlet guide vanes already provided in the ventilator housing. Any other suitable attachment is possible also.

Moreover, it is advantageous when the additional outlet guide apparatus is arranged in an auxiliary housing that can be fastened to the ventilator housing. This auxiliary housing with the additional outlet guide apparatus thus forms a mounting unit which as a whole can be attached to the ventilator housing.

It is advantageous when also a protective screen is additionally integrated in such an auxiliary housing.

Especially good throws and acoustic values result when the vane height ratio $H=h_{N1max}/h_{N2max}$ is between 0.2 and 2.5, preferably between 0.4 and 2, wherein $h_{N1max}$ is the maximum height of the outlet guide vanes in the ventilator housing and $h_{N2max}$ is the maximum height of the additional outlet guide vanes.

The subject matter of the application not only results from the subject matter of the individual claims but also from all specifications and features disclosed in the drawings and the description. Even if they are not subject matter of the claims, they are claimed as being essential to the invention insofar as they are novel, individually or in combination, relative to the prior art.

Further features of the invention result from the additional claims, the description, and the drawings.

The invention will be explained in more detail with the aid of some embodiments illustrated in the drawings.

DESCRIPTION OF PREFERRED EMBODIMENTS

The embodiments described in the following show ventilator units that are distinguished in that they comprise two outlet guide apparatus which are arranged in flow direction of the air one behind the other. With the second outlet guide apparatus, which is provided behind the first outlet guide apparatus in flow direction of the air, a very long throw is achieved. The two outlet guide apparatus ensure that the air is distributed far and uniformly in the respective room. This long throw of the ventilator unit is achieved with constructively simple measures in the form of the second outlet guide apparatus.

Figure 18:
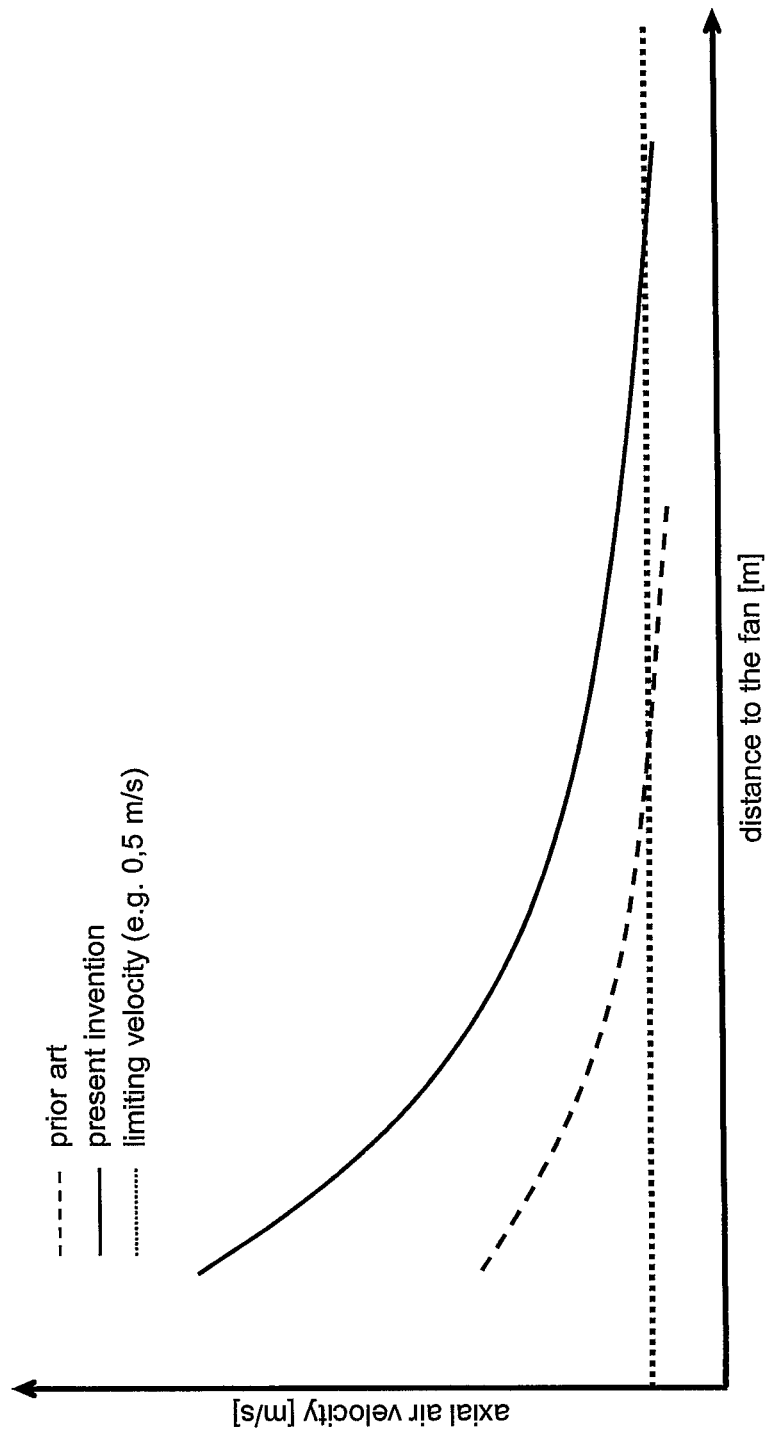
FIG. 18 is a diagram showing the axial velocity of the air stream generated by the ventilator unit as a function of the distance to the ventilator unit.

FIG. 18 shows the dependency of the throw from the axial air velocity. The dashed line characterizes conventional ventilator units while the solid line indicates the ventilator unit according to the invention. It is clearly apparent that, for any axial air velocity, the throw is significantly greater than for the known ventilator units.

The dotted line indicates the limiting velocity which is usually at 0.5 m/s at which the throw velocity is no longer measured because its values fluctuate too much in this range.

Figure 1:
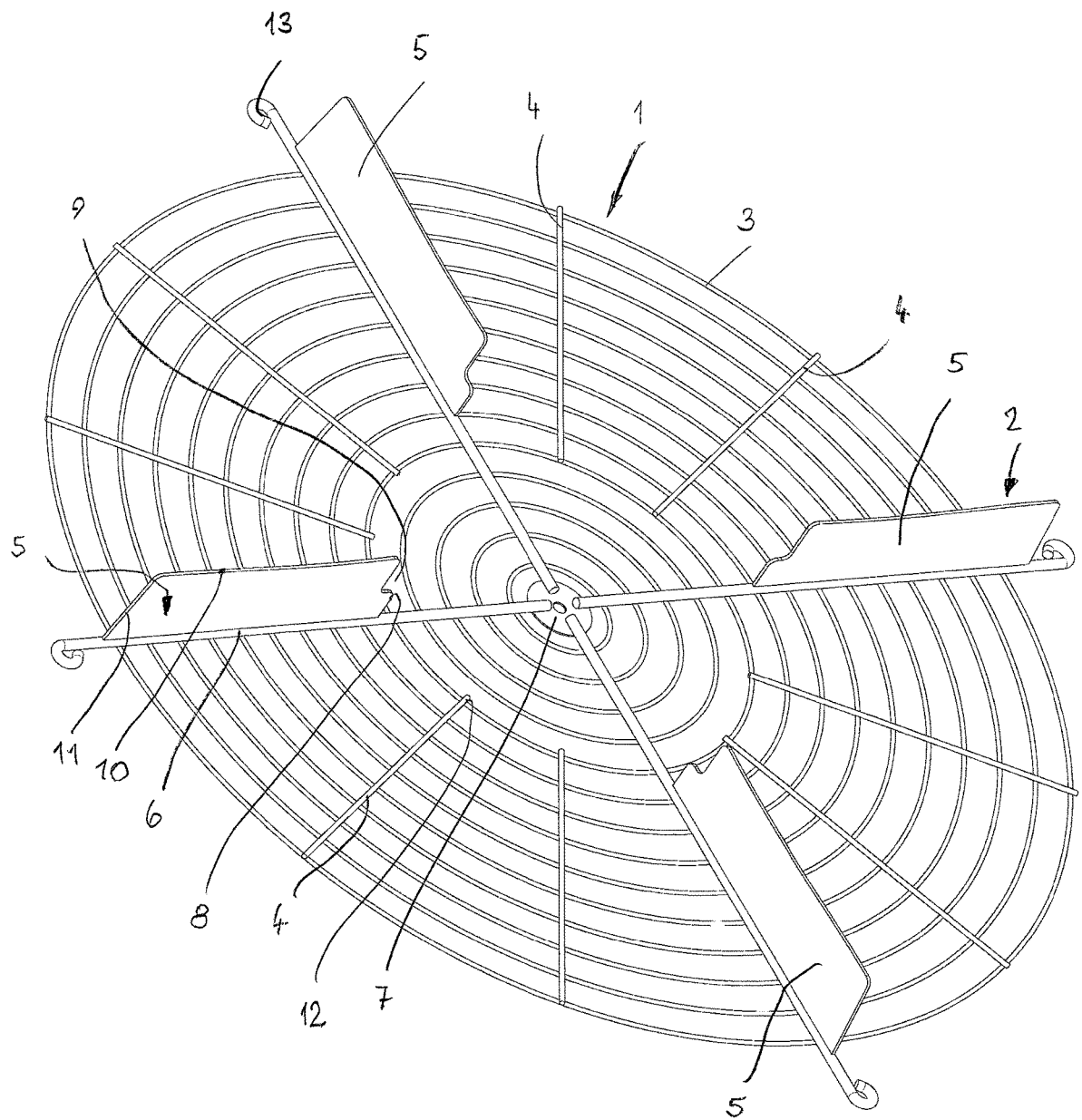
FIG. 1 shows, in perspective illustration, a first embodiment of a protective screen that is provided with an outlet guide apparatus.

FIG. 1 shows a protective screen 1 on which a second outlet guide apparatus 2 is mounted. The protective screen 1 has coaxially positioned rings 3 relative to a center axis; the rings 3 have the same spacing relative to each other in the embodiment. The spacing of the rings 3 is selected such that a reliable protection against contact is provided. The rings 3 are connected to each other by stays 4 which are provided spaced apart about the circumference of the protective screen 1. In the embodiment, the stays 4 extend radially and are fixedly connected to the rings 3 at the crossing points.

In deviation from the illustrated embodiment, the stays 4 can also be positioned angularly relative to the respective radial.

The stays 4 extend across most of the rings 3. However, the stays 4 can also extend across the entire radial width of the protective screen so that all rings 3 are connected to each other by the stays 4.

The rings 3 and the stays 4 are comprised advantageously of metallic material, in particular of a wire. In this case, the rings 3 and the stays 4 are welded to each other at the crossing points. The rings 3 and the stays 4 can also be comprised of plastic material.

The second outlet guide apparatus 2 is attached to one side of the protective screen 1. It has four outlet guide vanes 5 which are of the same configuration, respectively. They are positioned at angular spacings of 90° relative to each other. They are advantageously manufactured of sheet metal, preferably stamped as a flat strip from a sheet metal strip. The outlet guide vanes 5 can also be comprised of flat plastic material parts which are produced advantageously by an injection molding process.

The outlet guide vanes 5 are positioned on rod-shaped supports 6 which extend radially and are positioned at an angle of 90° relative to each other, respectively. The supports 6 are positioned centrally between two neighboring stays 4. The supports 6 serve not only for attachment of the outlet guide vanes 5 but also connect the rings 3 of the protective screen 1 with each other. In contrast to the stays 4, the supports 6 extend across all of the rings 3.

The inner ends of the supports 6 are fastened to a central circular plate 7 which is surrounded at a spacing by the innermost ring 3 of the protective screen 1. The supports 6 can be fastened with their inner end across a sufficient length fixedly to the circular plate 7.

The outlet guide vanes 5 have an approximately rectangular contour and are provided upright on the supports 6. The outlet guide vanes 5 are provided at their radial inner narrow side 8 with a recess 9 which is extending up to the longitudinal side 10 positioned remote from the protective screen 1.

The radial inner narrow side 8 is positioned at a spacing relative to the central circular plate 7 while the oppositely positioned radial outer narrow side 11 of the outlet guide vanes 5 is positioned radially outside of the outermost ring 3 of the protective screen 1. In the embodiment, the radial inner narrow side 8 is positioned approximately at the level of the inner ends 12 of the stays 4. This configuration is not mandatory. Depending on the diameter of the hub of the ventilator unit, the arrangement and configuration of the outlet guide vanes 5 can be designed differently.

The distribution of the stays 4 as well as of the supports 6 is provided such that they are provided at the same angular spacing about the circumference of the protective screen 1.

In deviation from the illustrated embodiment, the outlet guide vanes can also be provided without the recess 9 at the narrow side 8.

The supports 6 project radially outward past the outlet guide vanes 5 as well as past the outer ring 3 of the protective screen 1 and the ends of the supports 6 are designed as fastening elements 13 with which the entire protective screen 1 with the outlet guide apparatus 2 can be fastened to the ventilator unit.

Figure 14:
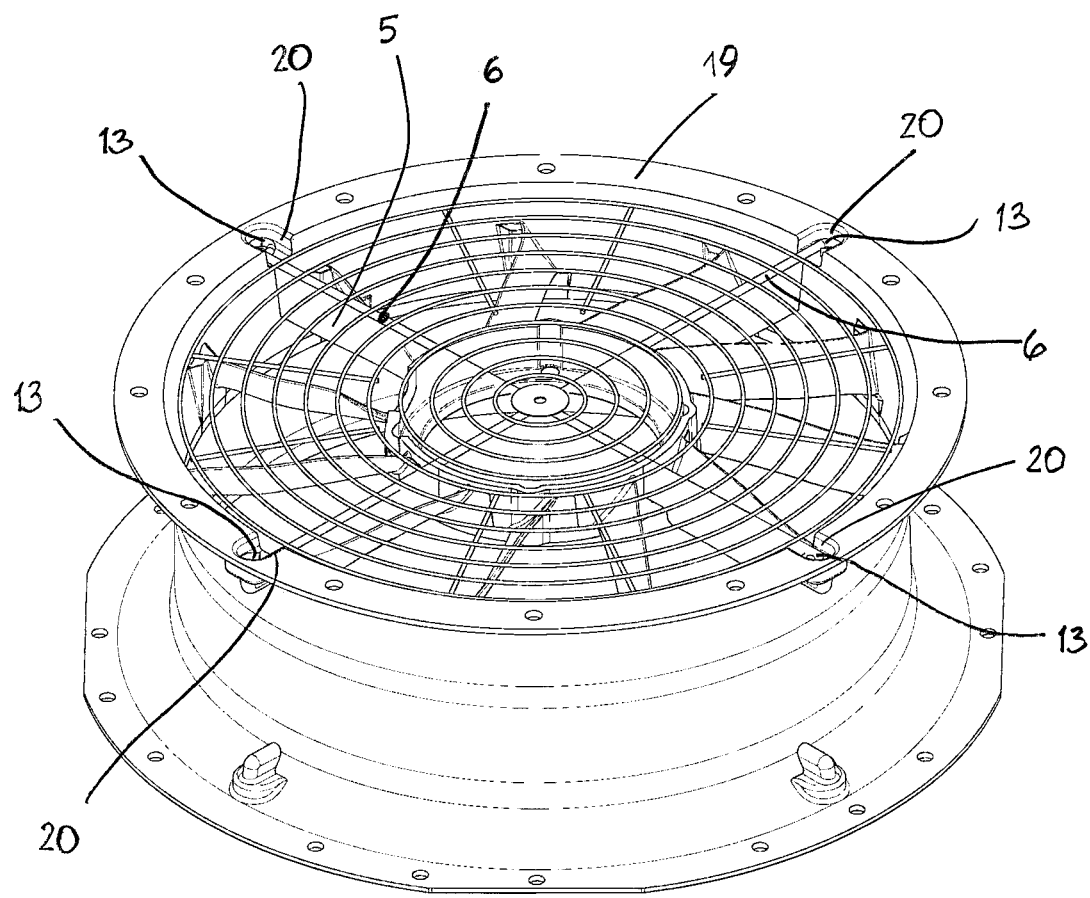
FIG. 14 shows, in an illustration corresponding to FIG. 8, a further embodiment of a ventilator unit according to the invention.
Figure 15:
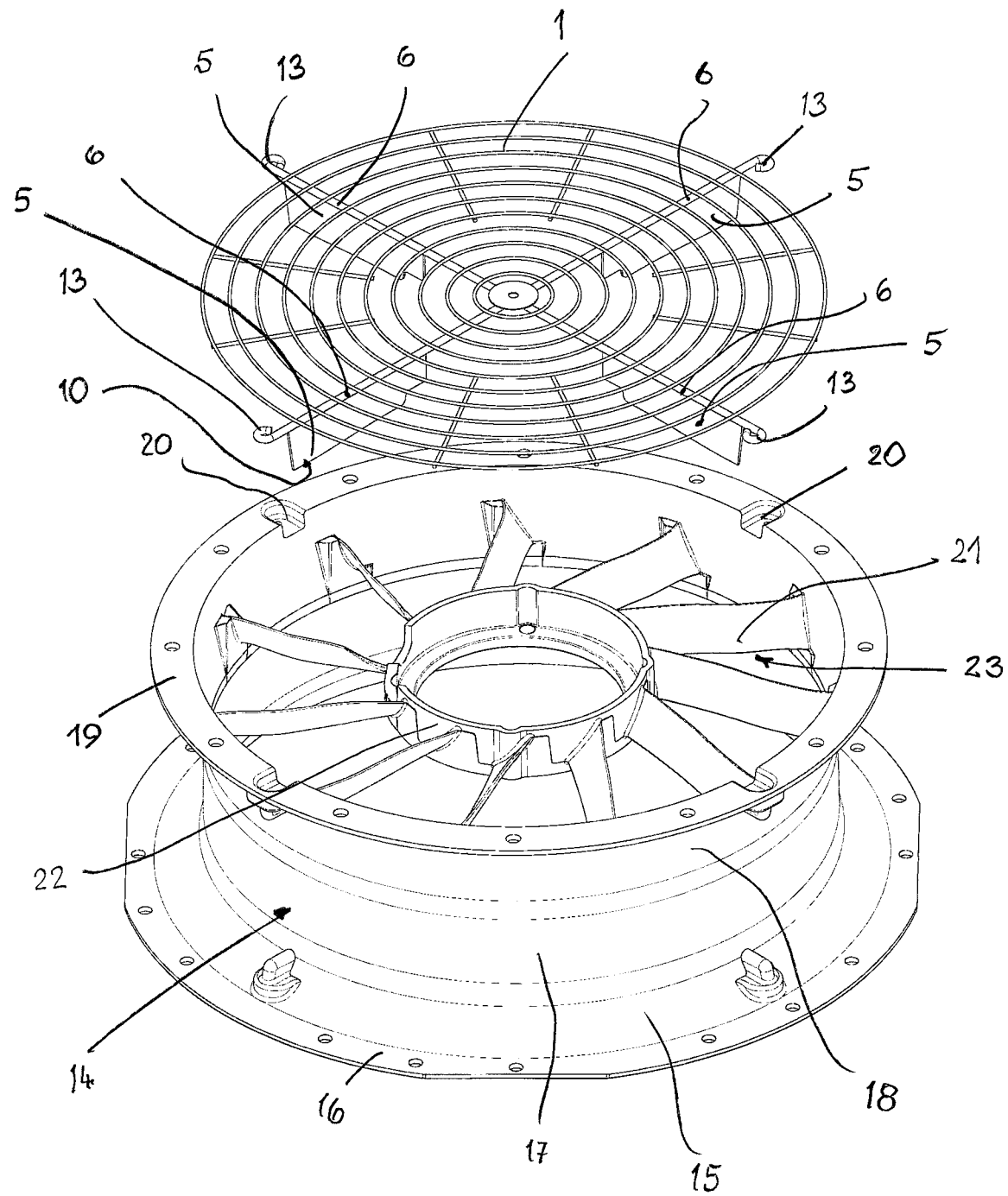
FIG. 15 shows, in an illustration corresponding to FIG. 9, the embodiment of the ventilator unit of FIG. 14.

FIGS. 14 and 15 show this protective screen 1 connected to the ventilator unit. The ventilator unit has a ventilator housing 14 which is formed on one side as an inlet nozzle 15. It passes into a fastening flange 16 by means of which the ventilator housing 14 and thus the entire ventilator unit can be fastened to a device or the like in a known way. The inlet nozzle 15 passes into a cylindrical region 17 that connects the inlet nozzle 15 to a diffusor 18 which widens continuously in flow direction of the air. An annular fastening flange 19 adjoins the diffusor 18. It comprises recesses 20 which are distributed about its circumference and which are engaged by the fastening elements 13 of the supports 6 of the outlet guide apparatus 2 (FIG. 14). The fastening elements 13 are fastened in a suitable way in the recesses 20.

Figure 16:
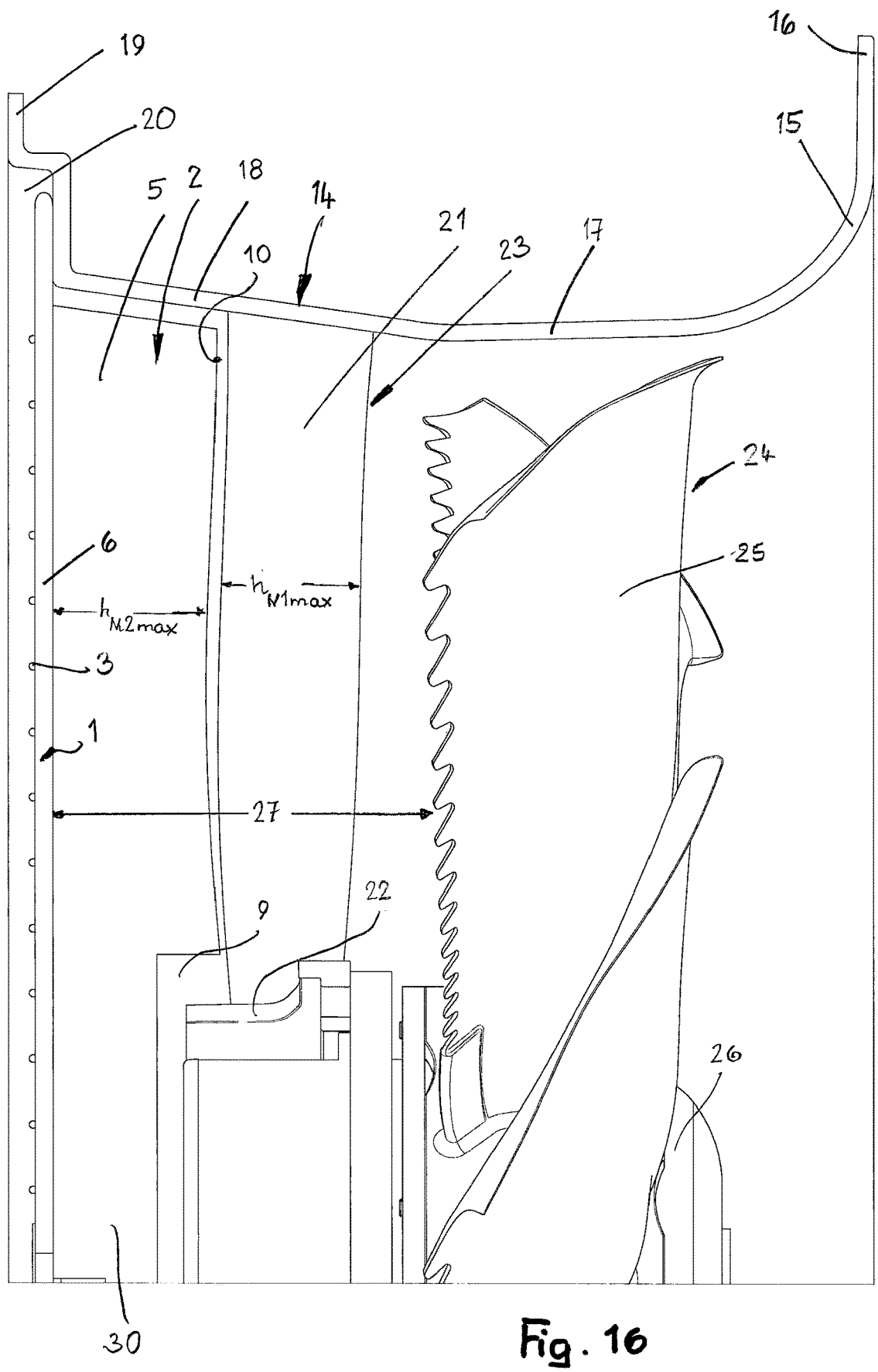
FIG. 16 shows in half section and in schematic illustration an embodiment of a ventilator unit.
Figure 17:
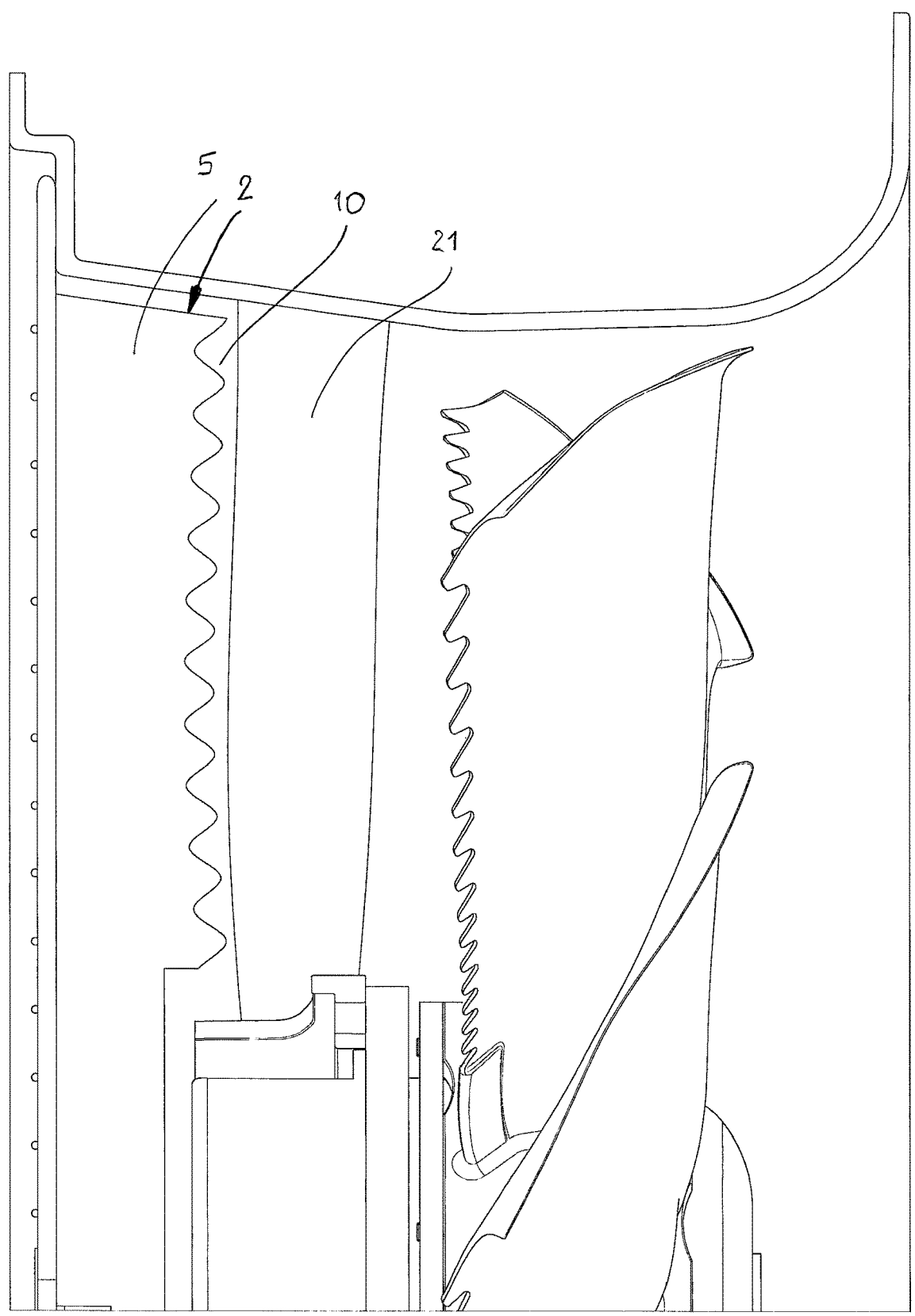
FIG. 17 shows in half section and in schematic illustration another embodiment of a ventilator unit.

On the inner wall of the diffusor 18, first outlet guide vanes 21 are fastened which are distributed about the circumference of the diffusor 18 and connect the diffusor 18 with an annular receptacle 22 for a drive motor 26 (FIG. 16). The first outlet guide vanes 21 are part of a first outlet guide apparatus 23 which is a component of the ventilator unit.

The protective screen 1 with the second outlet guide apparatus 2 is fastened on the fastening flange 19 such that the second outlet guide vanes 5 are facing the first outlet guide vanes 21 of the ventilator unit. The first and second outlet guide vanes 5, 21 of the two outlet guide apparatus 2, 23 are matched to each other such that, when the protective screen 1 is mounted, the second outlet guide vanes 5 are positioned in the area between the first outlet guide vanes 21 and the protective screen 1.

FIG. 16 illustrates the whole configuration of the ventilator unit with mounted protective screen 1. In the cylindrical region 17 of the ventilator housing 14 the fan wheel 24 with fan the blades 25 is positioned. The fan wheel 24 is rotatably driven about an axis of rotation by the drive motor 26 which is projecting into the receptacle 22 and is fastened in the receptacle in a known way. The first outlet guide apparatus 23 is arranged downstream of the fan wheel 24 in flow direction of the air and is arranged in the area of the diffusor 18. The second outlet guide apparatus 2 provided on the protective screen 1 is correlated with this first outlet guide apparatus 23 associated with the ventilator unit and is arranged downstream of the first outlet guide apparatus 23 in the flow direction of the air. The second outlet guide vanes 5 are spaced from the inner wall of the diffusor 18. The recesses 9 are provided for constructive reasons on the second outlet guide vanes 5 so that they will not collide with the receptacle 22.

The protective screen 1 has the distance 27 relative to the rotating fan wheel 24. The magnitude of the safety distance 27 has influence on the spacing that the rings 3 of the protective screen 1 have relative to each other. The smaller the safety distance 27, the smaller also the spacing between the rings 3 of the protective screen 1. By means of the second outlet guide apparatus 2, it is ensured that a long throw is ensured for a minimal safety distance 27 and corresponding minimal spacing of the rings 3 relative to each other. By means of the second outlet guide apparatus 2, it is achieved that long throws can be achieved while fulfilling the safety regulations.

Figure 2:
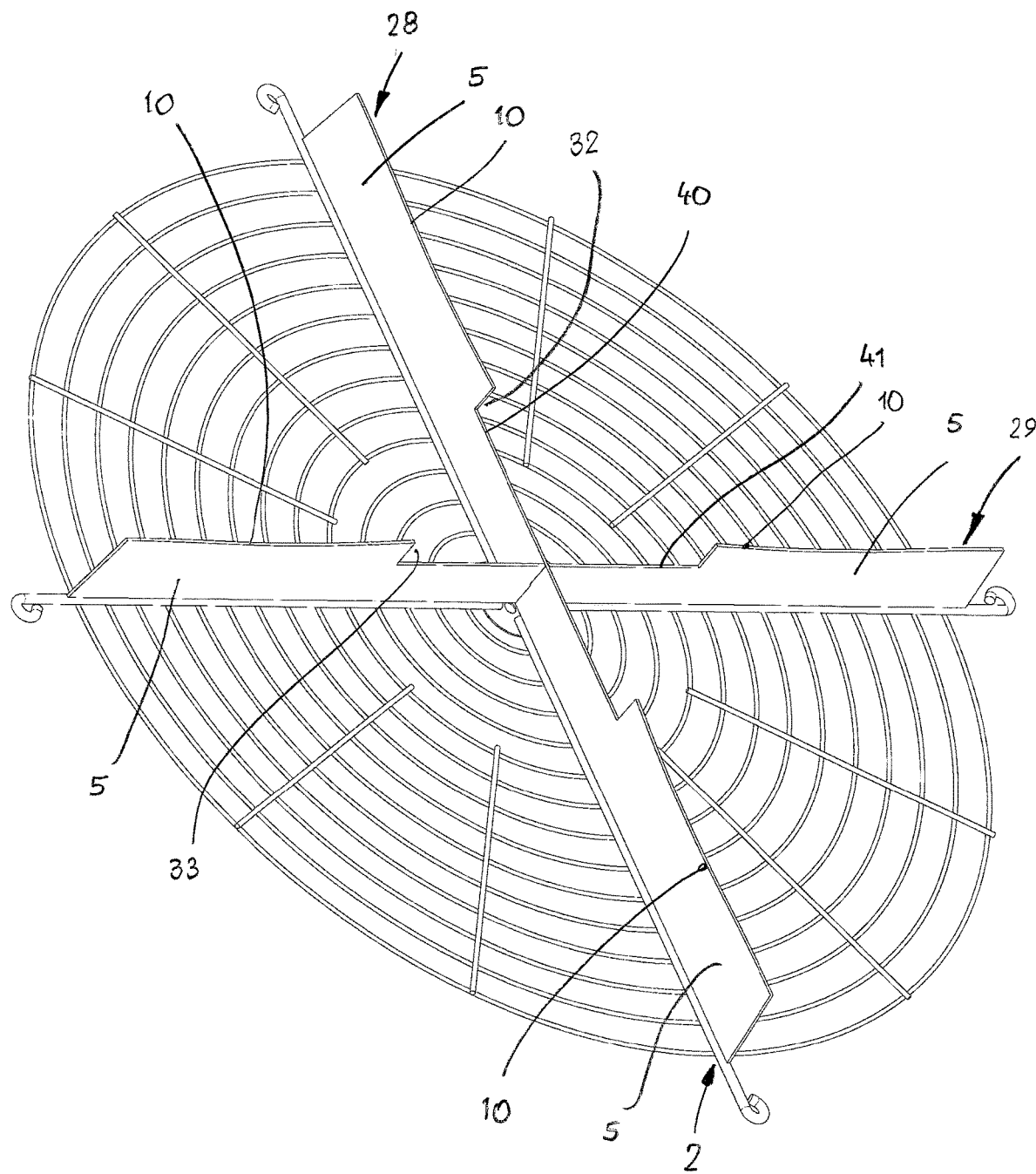
FIG. 2 shows, in perspective illustration, a second embodiment of a protective screen which is provided with a second embodiment of an outlet guide apparatus.
Figure 3:
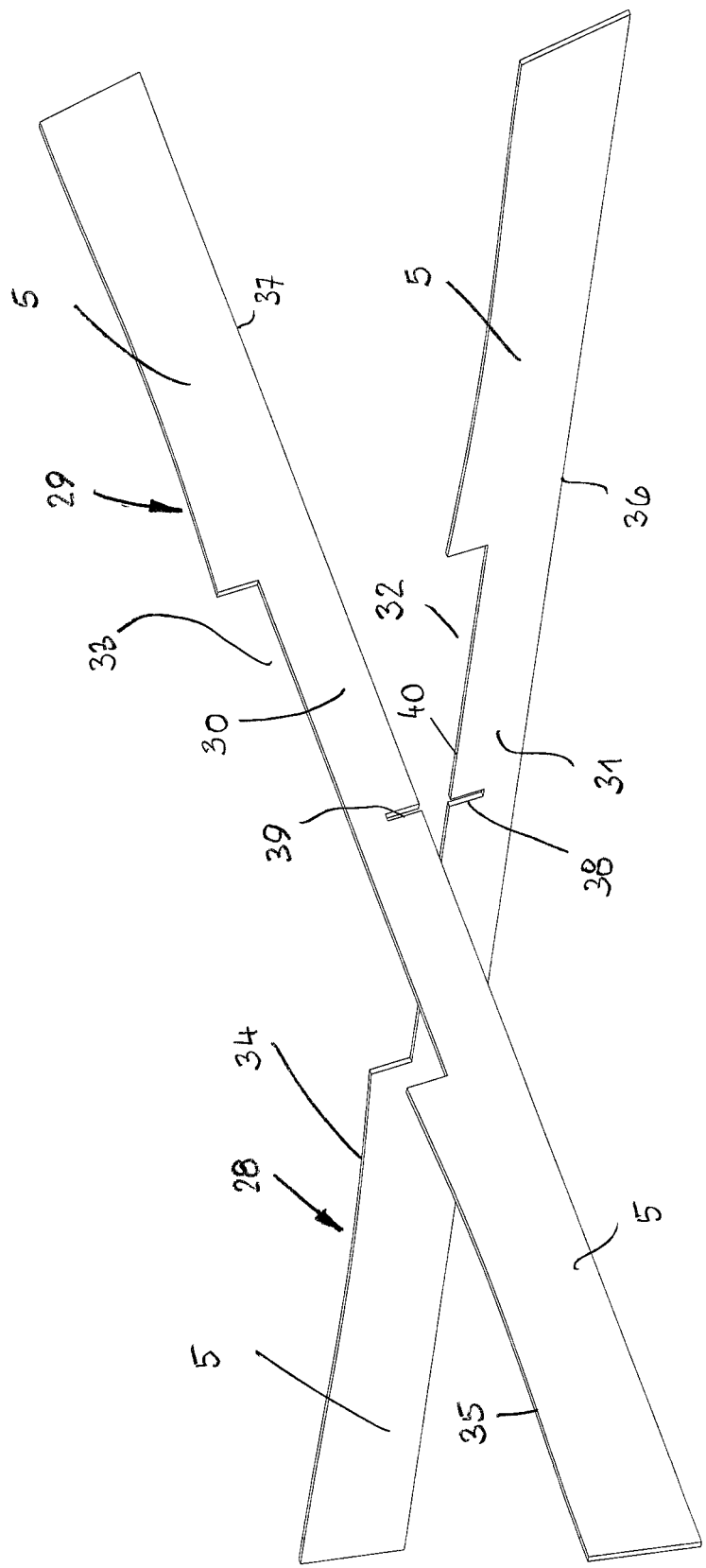
FIG. 3 shows, in perspective illustration, the outlet guide apparatus according to FIG. 2.

FIGS. 2 and 3 show an embodiment in which the outlet guide vanes 5 are substantially longer than in the embodiment according to FIG. 1. Outlet guide vanes that are positioned diametrically opposed to each other in pairs are embodied together as one piece. In this way, for the four outlet guide vanes 5, only two components 28, 29 are required. They each have a narrow connecting region 30, 31 which connects the pair of the two outlet guide vanes 5 of each component 28, 29 with each other. The two components 28, 29 can be stamped from sheet metal. The narrow connecting region 30, 31 results from a recess 32, 33 in one of the longitudinal sides 34, 35 of the components 28, 29.

Both components 28, 29 have at half the length a transverse slot 38, 39, respectively. The transverse slot 38 opens at the edge 40 of the recess 32 while the transverse slot 39 opens at the longitudinal side 37 of the component 29. Both transverse slots 38, 39 are located at half the length of the recesses 32, 33 and extend across half the height of the connecting region 30, 31, respectively.

The two components 28, 29 can be inserted into each other by means of their transverse slots 38, 39 (FIG. 2). In the assembled state, the edges 40, 41 of the recesses 32, 33 are positioned in a common plane (FIG. 2).

As in the preceding embodiment, the longitudinal sides 10 of the outlet guide vanes 5 of the outlet apparatus 2 are also positioned in a common plane.

FIG. 16 shows this type of outlet guide vanes with the connecting regions in which outlet guide vanes that are positioned diametrically opposite each other are connected to each other.

In this embodiment, the components 28, 29, inasmuch as they are made of metal, can be produced very simply by a single stamping step. The components 28, 29 which extend, like the outlet guide vanes 5 of the embodiment according to FIG. 1, perpendicular to the protective screen 1 enable an inexpensive manufacture and production of the protective screen with outlet guide apparatus. The components 28, 29 are fastened in a suitable way on the rod-shaped supports 6, preferably are connected by welding.

As in the preceding embodiment, the components 28, 29 can also be comprised of plastic material and can be produced by an injection molding process. In this case, the components 28, 29 can be clipped onto the protective screen 1, for example. In this case, rod-shaped supports are not required. This applies also to the embodiment according to FIG. 1.

In other respects, the outlet guide apparatus 2 is of the same configuration as in the embodiment of FIG. 1.

Figure 4:
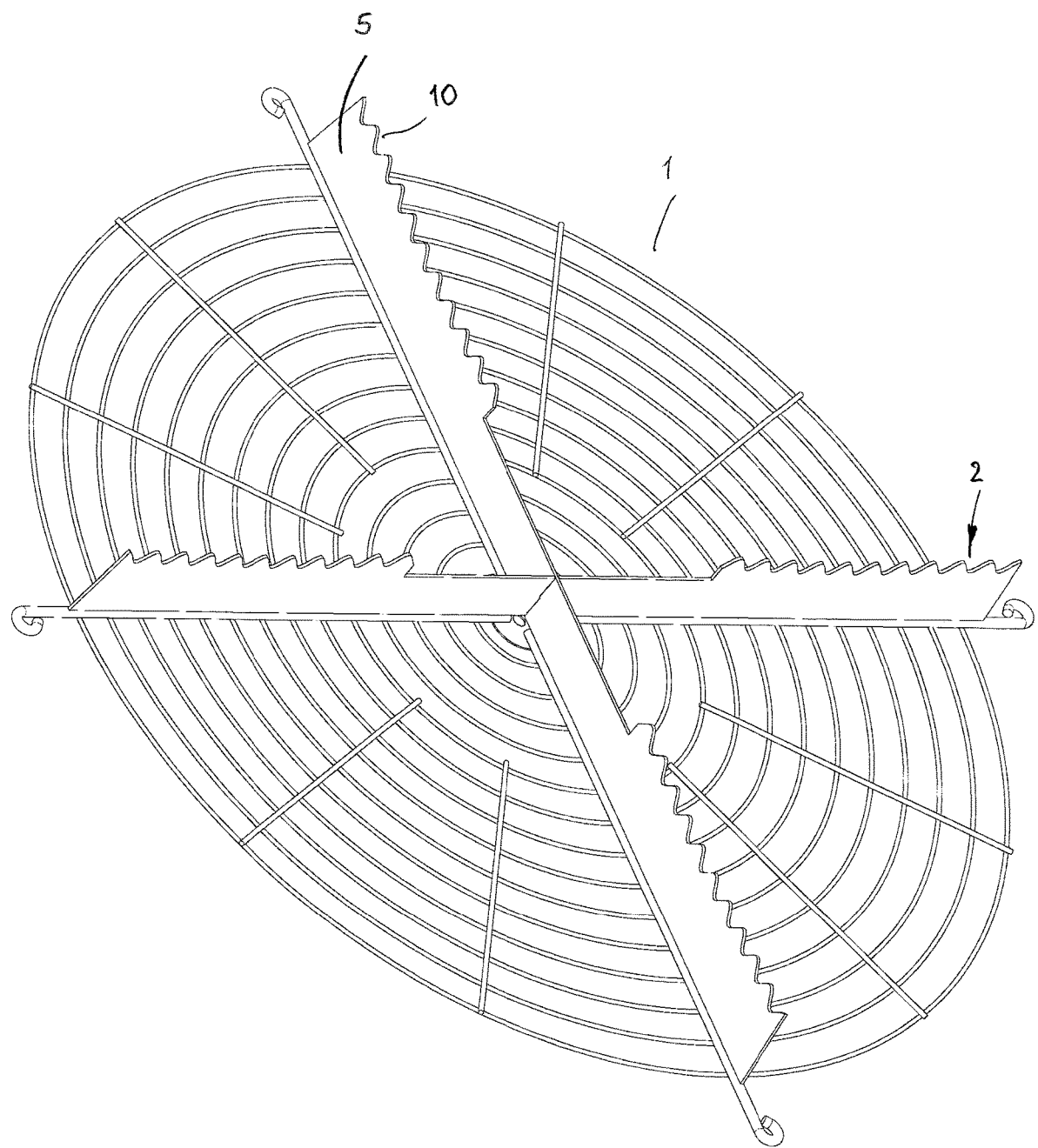
FIG. 4 shows, in perspective illustration, a further embodiment of a protective screen provided with a further embodiment of an outlet guide apparatus.

The outlet guide apparatus 2 according to FIG. 4 differs from the embodiment according to FIGS. 2 and 3 only in that the longitudinal side 10 of the outlet guide vanes 5 are corrugated or serrated. As can be seen in FIG. 16, this profiled longitudinal side of the outlet guide vanes 5, viewed in radial direction, are positioned opposite the outlet guide vanes 21 at a minimal spacing.

The corrugated or serrated configuration of the leading edge 10 of the outlet guide vanes 5 facing the air stream is only one example in regard to how the throw and the acoustics of the ventilator unit can be influenced by means of the configuration of this leading edge.

The outlet guide apparatus according to FIG. 4 is in other respects of the same configuration as the outlet guide apparatus according to FIGS. 2 and 3. The outlet guide vanes 5 are positioned respectively in radial planes of the protective screen 1 and are of the same configuration.

Figure 5:
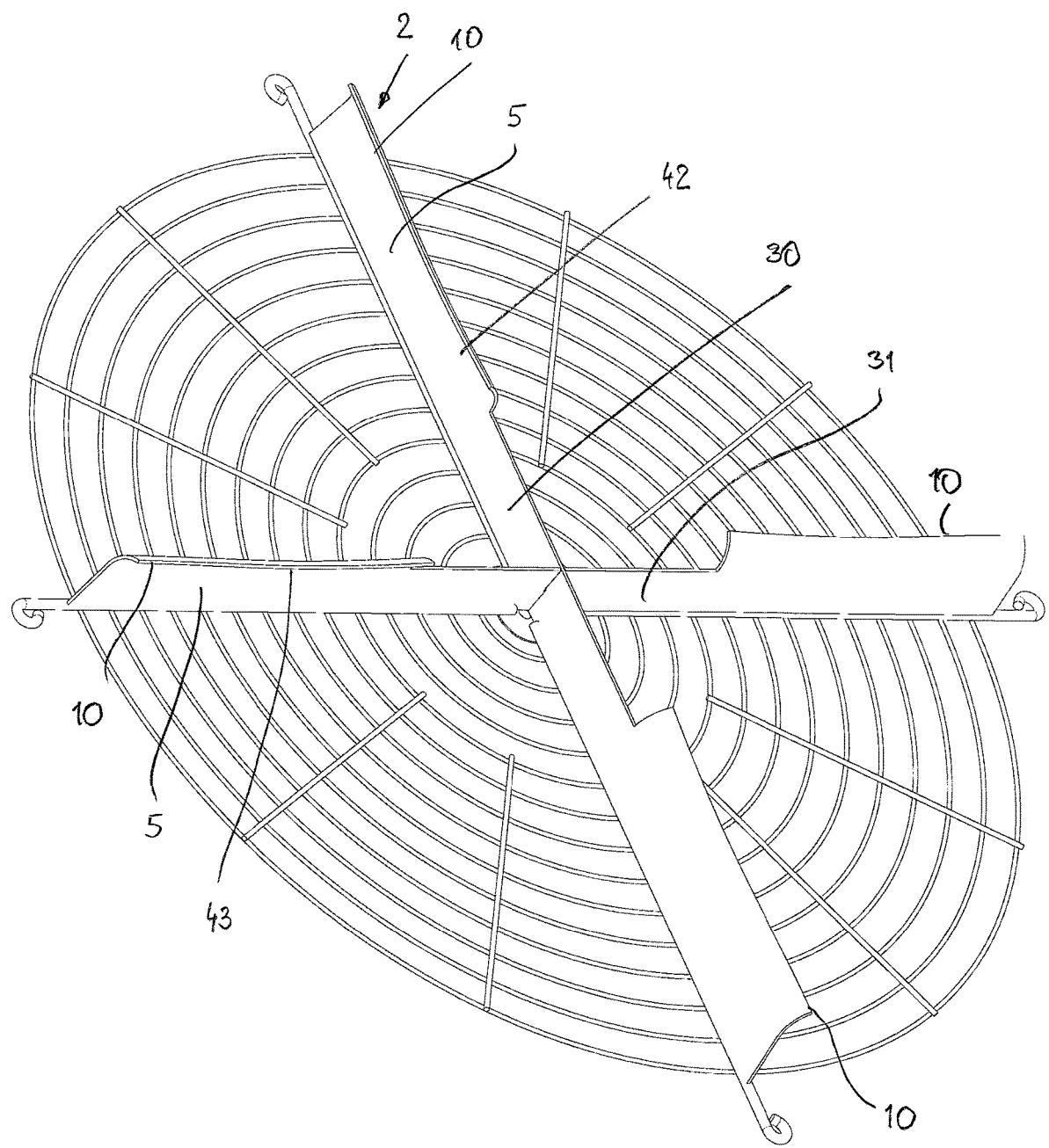
FIG. 5 shows, in perspective illustration, a further embodiment of a protective screen provided with a further embodiment of an outlet guide apparatus.

The outlet guide apparatus 2 according to FIG. 5 is distinguished in that the outlet guide vanes 5, in the part which is projecting past the connecting region 30, 31, are continuously curved across their length. The curved regions 42, 43 of all outlet guide vanes 5 are curved in the same direction. Of course, the projecting parts must not mandatorily be continuously curved.

In this way, the achievable throw of the ventilator unit can be influenced also. In other respects, the embodiment according to FIG. 5 is embodied the same as the embodiment according to FIGS. 2 and 3.

Such a curved configuration of the outlet guide vanes 5 can also be provided in the embodiment according to FIG. 4 with the profiled longitudinal side or leading edge 10.

Figure 6:
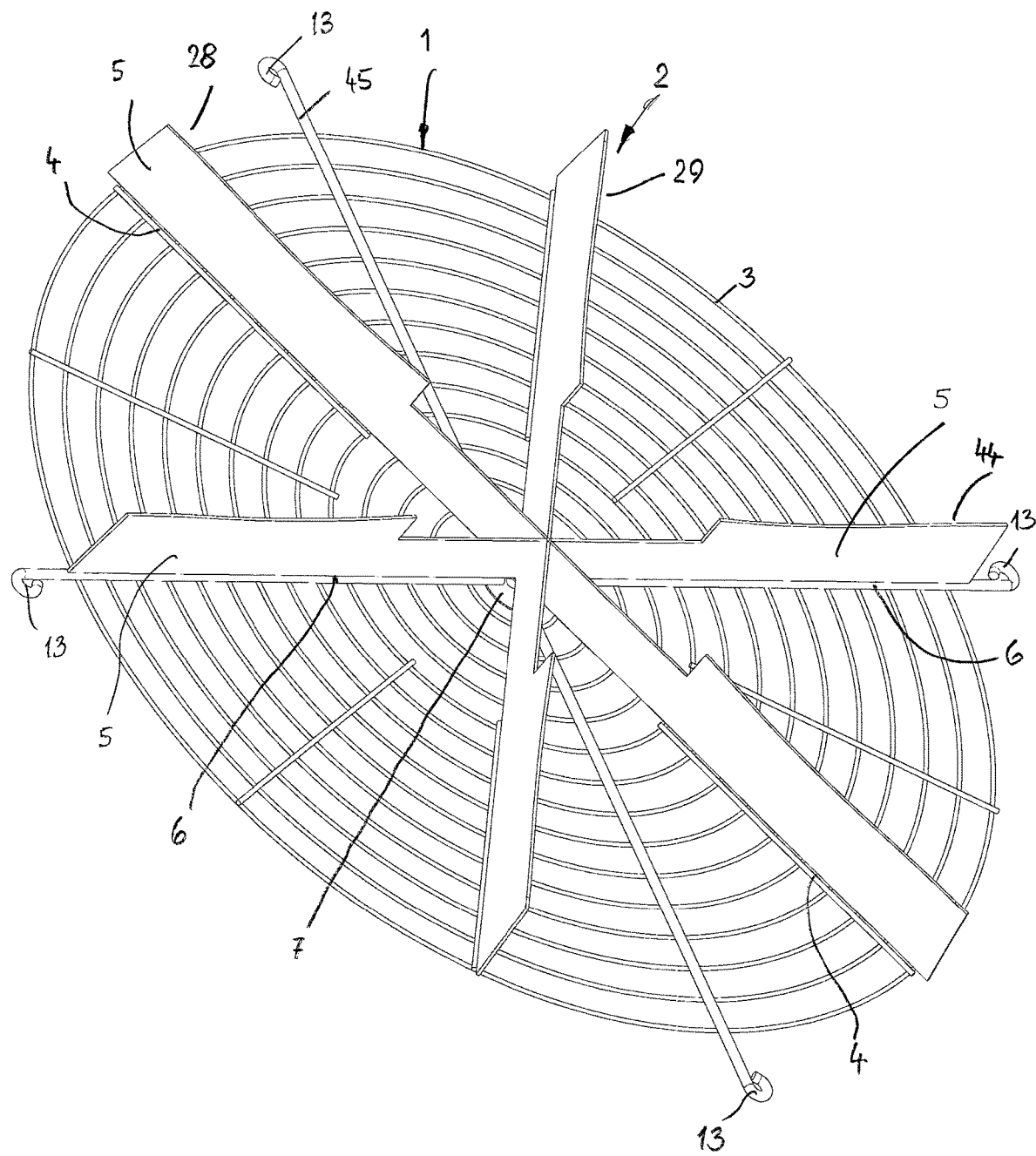
FIG. 6 shows, in perspective illustration, a further embodiment of a protective screen provided with a further embodiment of an outlet guide apparatus.
Figure 7:
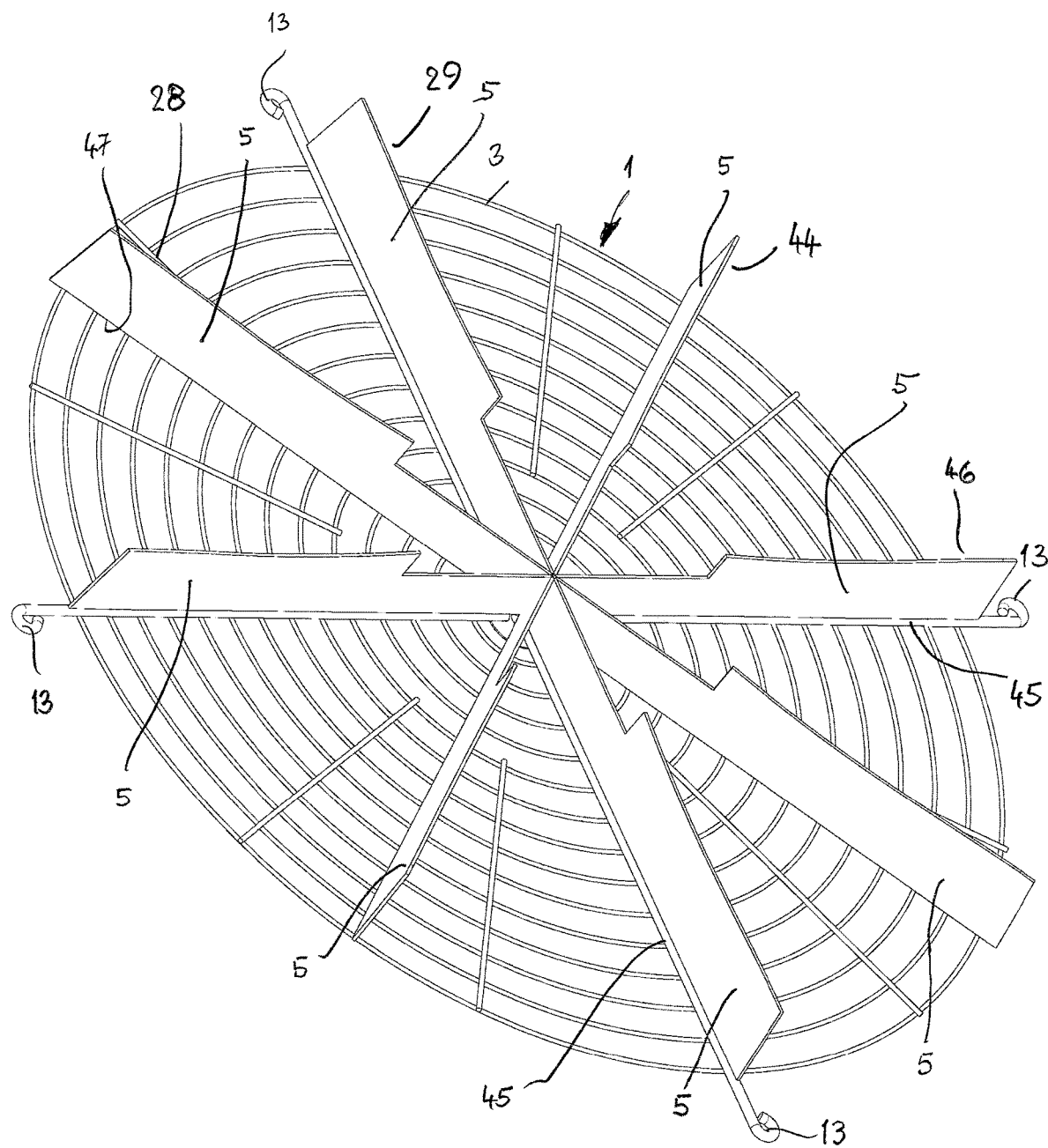
FIG. 7 shows, in perspective illustration, a further embodiment of a protective screen provided with a further embodiment of an outlet guide apparatus.

FIGS. 6 and 7 show respectively the possibility of using more than two components 28, 29 for the outlet guide apparatus. In the embodiment according to FIG. 6, three components 28, 29, 44 are used which are of the same configuration as the components 28, 29 of the embodiment according to FIGS. 2 and 3. The three components 28, 29, 44 are simply inserted into each other by means of the transverse slots and fastened on the protective screen 1.

The three components 28, 29, 44 are distributed at the same angular spacing relative to each other so that the outlet guide vanes 5 each have the same angular spacing relative to each other.

The component 44 is fastened on the two rod-shaped supports 6 which are extending across all rings 3 of the protective screen 1 and are fastened with their radial inner ends on the central circular plate 7, as is the case also in the embodiment according to FIGS. 2 and 3. The ends of the supports 6 which are projecting past the outer ring 3 are formed to fastening elements 13.

The two other components 28, 29 are fastened on the stays 4 of the protective screen 1 which are extending from the outer ring 3 across only a portion of the protective screen 1, as has been explained with the aid of FIG. 1. The outlet guide vanes 5 of these components 28, 29 are approximately as long as these stays 4.

In order for a safe attachment of the protective screen 1 on the ventilator unit to be possible, the protective screen is provided with an additional fastening stay 45 which is extending diagonally across the protective screen 1 and, at both ends projecting radially past the protective screen 1, is provided with the fastening elements 13. They are formed advantageously by appropriate deformation of the stay ends and are of the same configuration as the fastening elements 13 on the supports 6. The fastening stay 45 is fixedly connected at the crossing points to the individual rings 3 of the protective screen 1, preferably by welding.

Instead of the diagonally continuous fastening stay 45, it is also possible to provide two separate fastening stays whose radial inner ends are fastened to the central circular plate 7. The fastening stay 45 extends in the area between neighboring outlet guide vanes 5.

In this embodiment, the outlet guide vanes 5 can also be embodied in accordance with the embodiments of FIGS. 4 and 5.

In the embodiment according to FIG. 7, four components 28, 29, 44, 46 are provided which are of identical design among each other and correspond to the embodiment according to FIGS. 2 and 3.

The component 28 is positioned with one of its longitudinal sides 47 immediately on the rings 3 of the protective screen 1 and is connected with them in a suitable way.

The component 29 is fastened upright on the fastening stay 45. The ends of the fastening stay 45 provided with the fastening elements 13 project radially past the ends of the components 29.

The component 44 is also fastened, like the component 28, immediately on the rings 3 of the protective screen 1. The component 46 finally is seated on an additional fastening stay 45 which is projecting with its ends provided with the fastening elements 13 radially past the component 46.

The component 44 finally is fastened, like the component 28, immediately on the rings 3 of the protective screen 1.

The distribution of the outlet guide vanes 5 about the circumference of the protective screen 1 is regular, i.e., the outlet guide vanes 5 have the same spacing relative to each other about the circumference. The distribution can also be irregular, such that the outlet guide vanes 5 have different spacings relative to each other about the circumference of the protective screen 1.

All components 28, 29, 44, 46 are arranged upright, wherein the outlet guide vanes 5 each are positioned in a radial plane. The outlet guide vanes can also be of a configuration in accordance with FIGS. 4 and 5.

As illustrated by the described embodiments, the throw velocity can be optimally adjusted to the application situation by an appropriate configuration of the outlet guide vanes 5 and/or by the number of outlet guide vanes.

Figure 8:
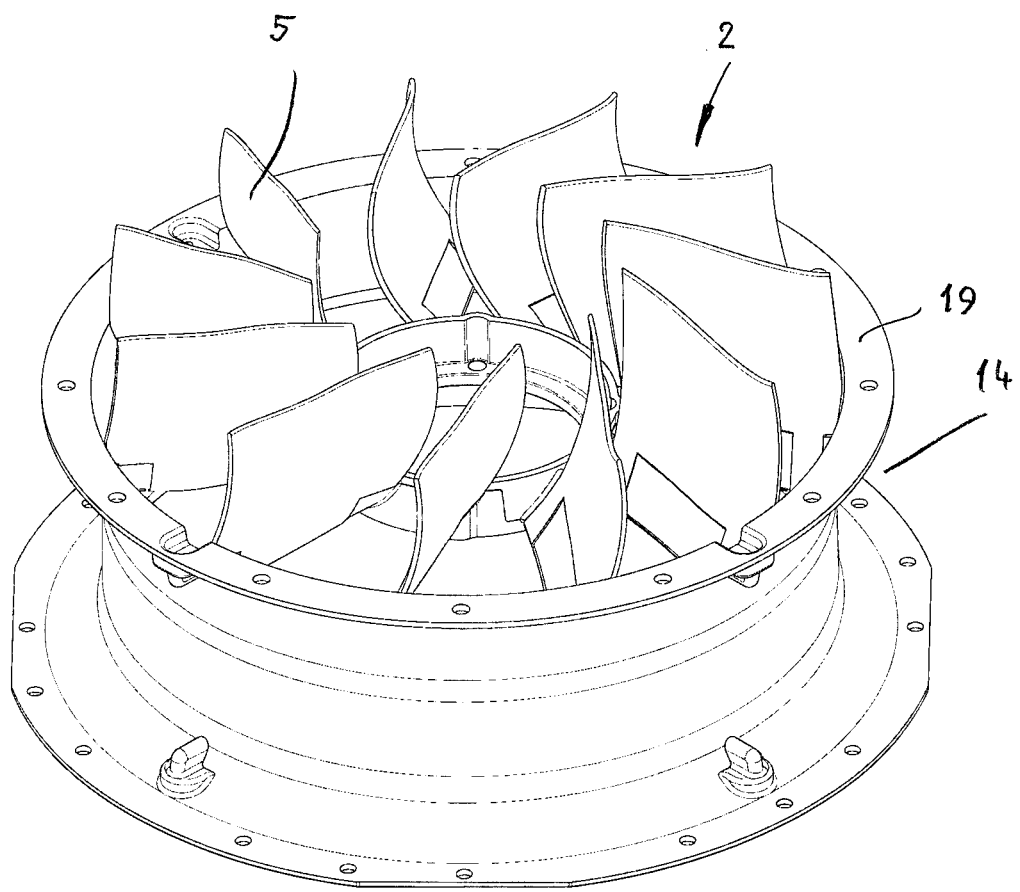
FIG. 8 shows, in perspective illustration, a first embodiment of a ventilator unit according to the invention.
Figure 9:
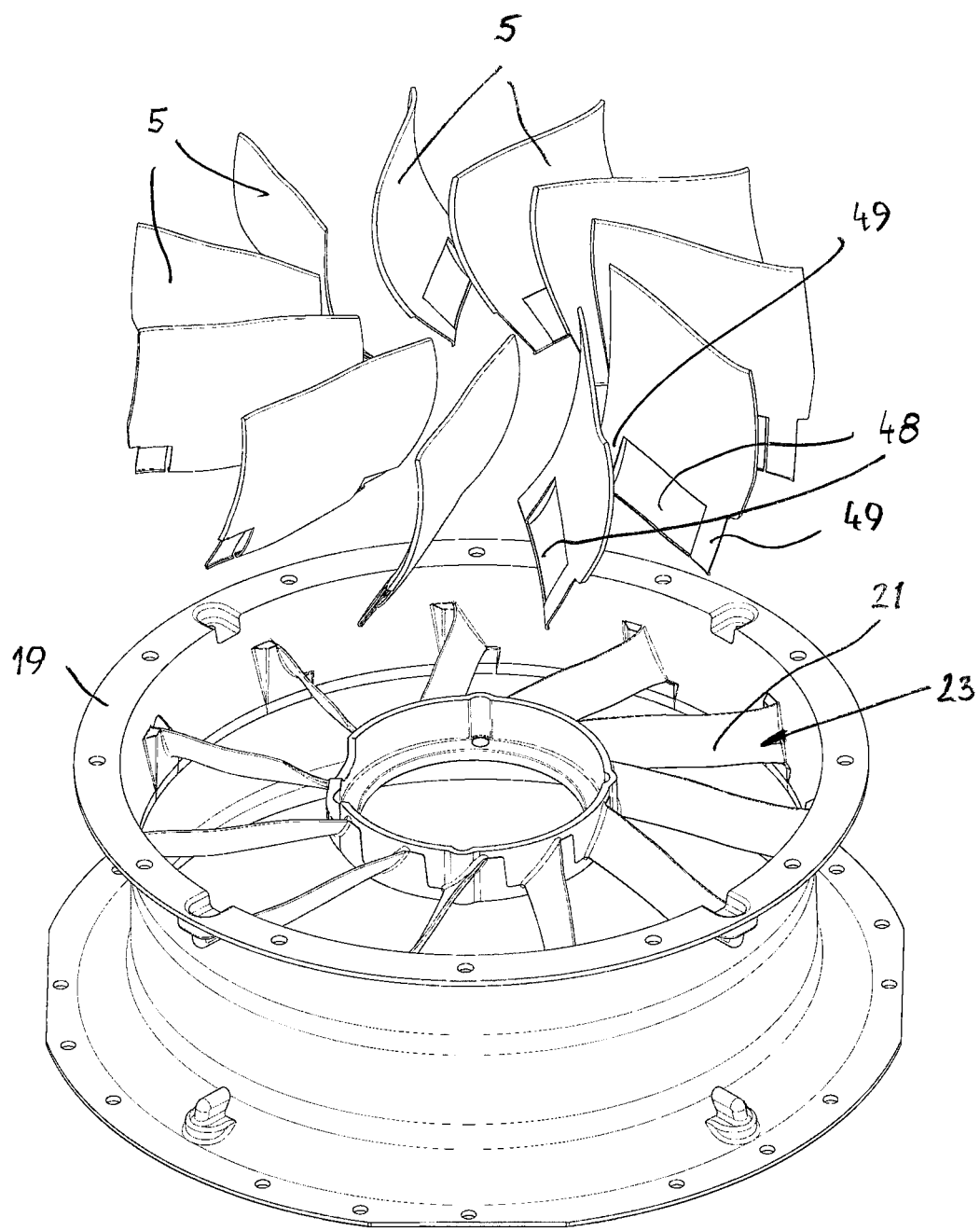
FIG. 9 shows the ventilator unit according to FIG. 8 in exploded illustration.

FIG. 8 shows the possibility of using for the second outlet guide apparatus 2 individual second outlet guide vanes 5 which are plugged onto the first outlet guide vanes 21 of the first outlet guide apparatus 23 (FIG. 9). The first outlet guide apparatus 23 is a component of the ventilator unit which has been described with the aid of FIGS. 14 and 15. The ventilator unit according to FIGS. 8 and 9 is of the same configuration as the ventilator unit according to FIGS. 14 and 15.

The second outlet guide vanes 5 are advantageously produced by an injection molding process from plastic material and are attached to the outlet guide vanes 21 in a suitable way, for example, clipped on. For this purpose, the outlet guide vanes 5 can be provided in their clip-on region, for example, with adjacently arranged clamping tabs 48, 49 (FIG. 9) of which the edge-side clamping tabs 49 are positioned on one side and the intermediately positioned clamping tabs 48 on the other side of the outlet guide vane 21 when the outlet guide vane 5 is mounted. By means of the clamping tabs 48, 49, the outlet guide vanes 5 can be securely fastened on the outlet guide vanes 21. The outlet guide vanes 5 project in mounted position axially past the fastening flange 19 of the ventilator housing 14. However, the outlet guide vanes 5 advantageously do not project past the fastening flange 19.

In the embodiment, the outlet guide vanes 5 are designed across the axial height as well as across their radial length so as to be curved, respectively. Depending on the conditions of use, the outlet guide vanes 5 can also have any other suitable shape.

Figure 10:
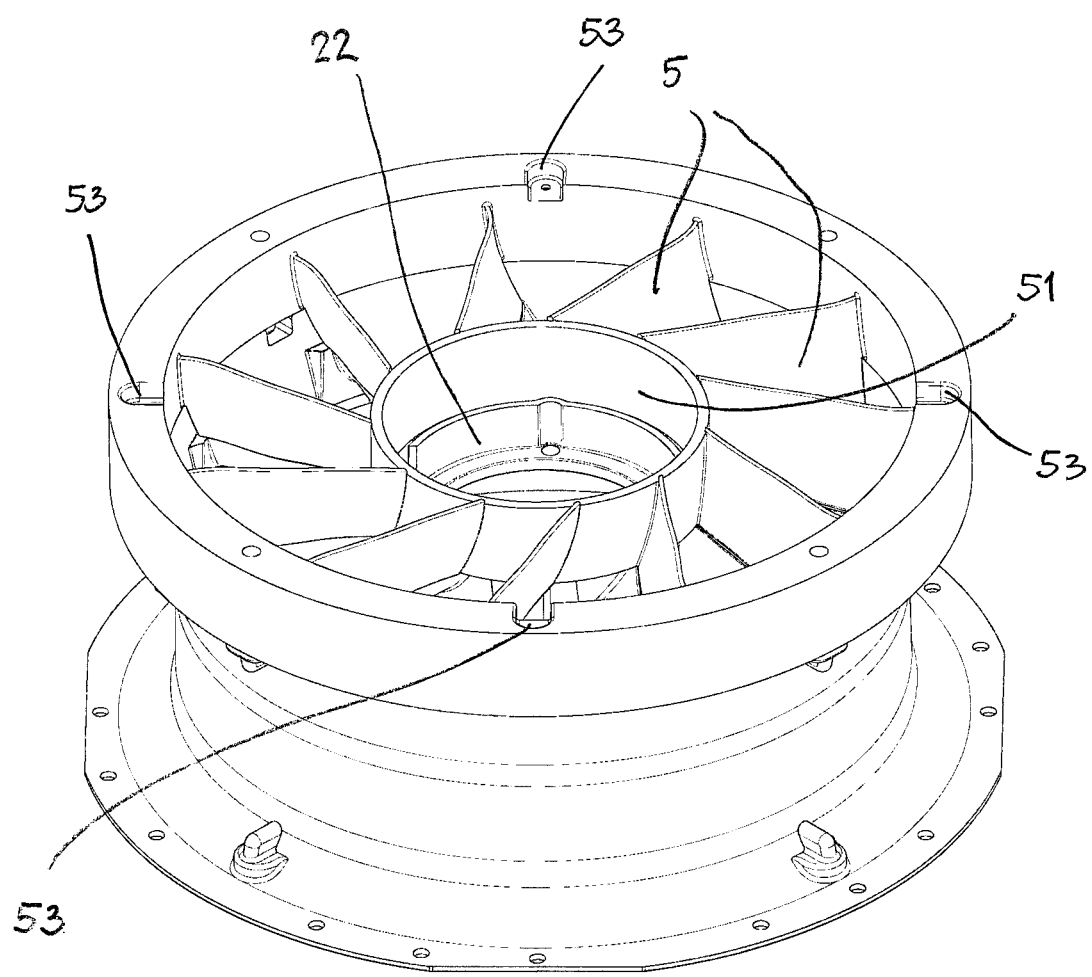
FIG. 10 shows, in an illustration corresponding to FIG. 8, a further embodiment of a ventilator unit according to the invention.
Figure 11:
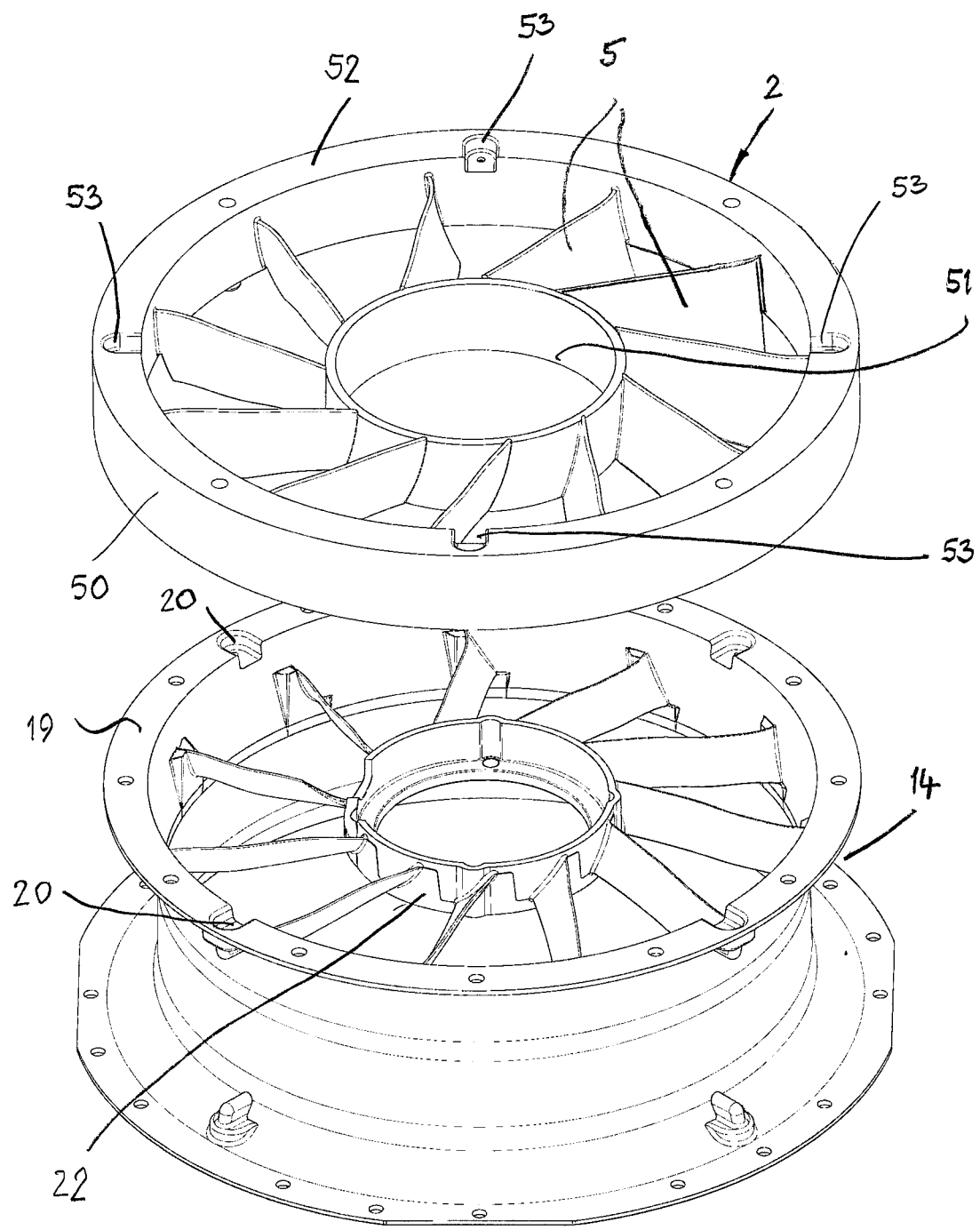
FIG. 11 shows, in an illustration corresponding to FIG. 9, the embodiment of the ventilator unit of FIG. 10.

In the embodiment according to FIGS. 10 and 11, the second outlet guide vanes 5 of the second outlet guide apparatus 2 are fastened in an annular auxiliary housing 50 which is fastened on the fastening flange 19 of the ventilator housing 14. The outlet guide vanes 5 are fastened with their radial outer end to the inner wall of the auxiliary housing 50 and with their radial inner end to an annular receptacle 51. The receptacle 51 forms an extension of the receptacle 22 in the ventilator housing 14 when the second outlet guide apparatus 2 is mounted. The auxiliary housing 50 is fastened to the fastening flange 19 of the ventilator housing 14. At the end face 52 of the auxiliary housing 50, recesses 53 are provided which are of the same configuration as the recesses 20 in the fastening flange 19 of the ventilator housing 14. The recesses 53 receive the fastening elements 13 of the protective screen 1, in case such a protective screen must be attached to the housing 50.

The auxiliary housing 50 with the second outlet guide vanes 5 and the cylindrical receptacle 51 is advantageously formed as one piece as an injection molded part.

Since the auxiliary housing 50 as well as the ventilator housing 14 are provided with recesses 20, the protective screen can be attached, as needed, to the ventilator housing 14 or to the auxiliary housing 50. Since the auxiliary housing 50 is detachably connected to the ventilator housing 14, the protective screen is fastened to the ventilator housing 14 when the auxiliary housing 50 is not used.

The second outlet guide vanes 5 are designed such that they are contacting the first outlet guide vanes 21 and the spacing between them is minimal so that a transition as continuous as possible between the first and second outlet guide vanes 5, 21 is produced.

Figure 12:
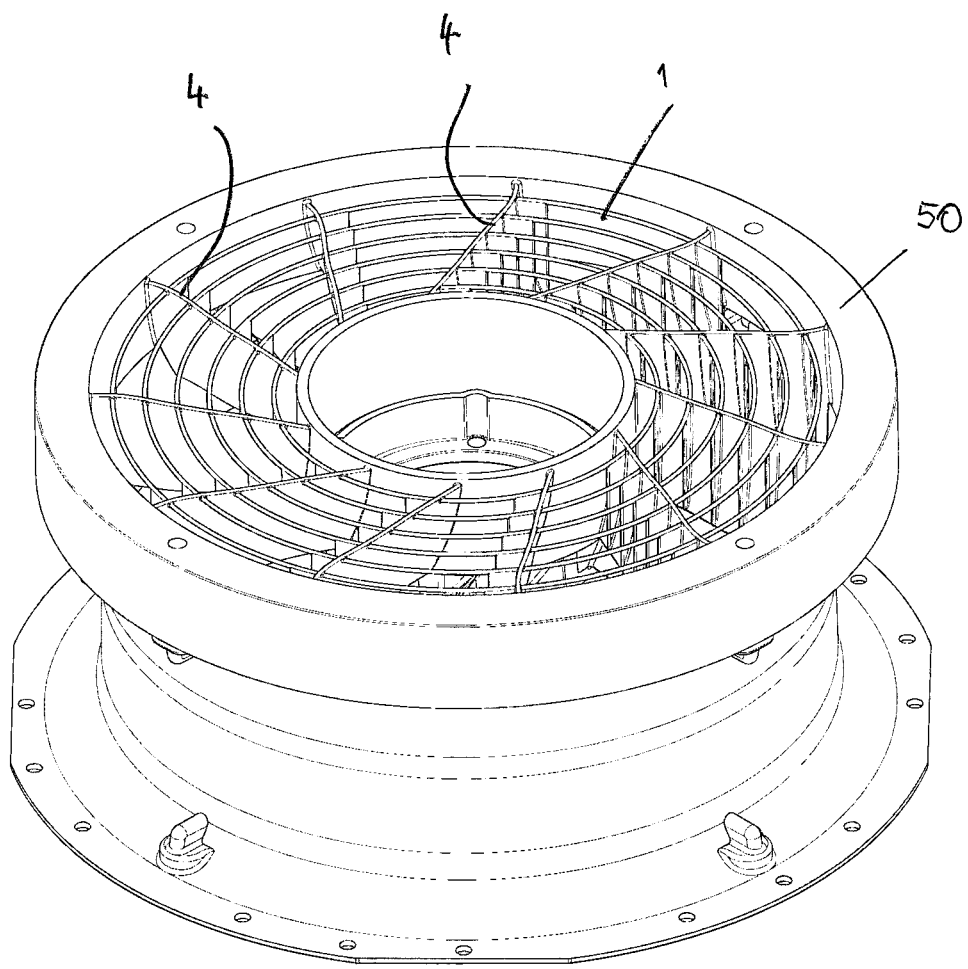
FIG. 12 shows, in an illustration corresponding to FIG. 8, a further embodiment of a ventilator unit according to the invention.
Figure 13:
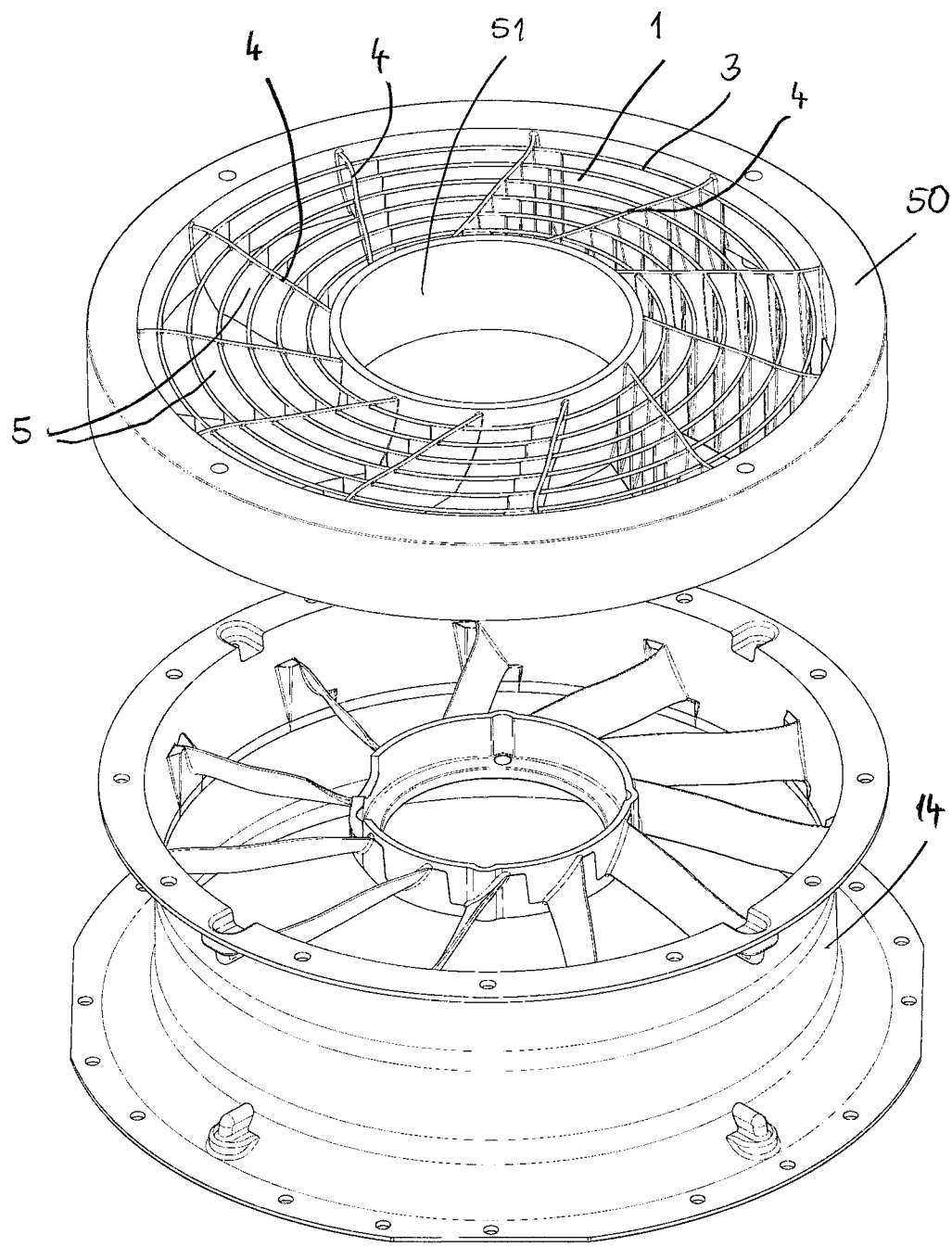
FIG. 13 shows, in an illustration corresponding to FIG. 9, the embodiment of the ventilator unit of FIG. 12.

In the embodiment according to FIGS. 12 and 13, the auxiliary housing 50 is provided with the protective screen 1 that is fastened to the cylindrical inner wall of the housing auxiliary 50. The protective screen 1 has coaxially positioned rings 3 which are connected to each other by transversely extending stays 4. In accordance with the preceding embodiment, the outlet guide vanes 5 are fastened with the radial outer end to the inner wall of the auxiliary housing 50 and with their radial inner end to the receptacle 51. The protective screen 1 is designed such that it surrounds with its innermost ring 3 the cylindrical receptacle 51 at a minimal spacing, viewed in a plan view of the auxiliary housing 50.

In this embodiment, the protective screen 1 is integrated into the auxiliary housing 50 as a protection against contact so that the auxiliary housing 50 has no recesses 53 at its end face, as is the case in the embodiment according to FIGS. 10 and 11. The auxiliary housing 50 with the protective screen 1 forms thus a mounting-ready unit which can be fastened simply on the ventilator housing 14 of the ventilator unit. The ventilator units according to FIGS. 8 to 17 have the diffusor 18. The ventilator housing 14 of the ventilator unit can also be designed such that it has no diffusor region.

The outlet guide vanes 5 of FIGS. 8 to 13 have straight trailing edges. They can however also be profiled, for example, corrugated or serrated.

The first outlet guide vanes 21 have a maximum height $h_{N1max}$ and the second outlet guide vanes 5 have a height $h_{N2max}$. It has been found that particularly good throws and acoustic values result when the vane height ratio $H=h_{N1max}/h_{N2max}$ between the outlet guide vanes 21 and 5 is between 0.2 and 2.5, preferably between 0.4 and 2.0.

As is shown in FIGS. 8 to 17, the first outlet guide vanes 21 of the first outlet guide apparatus 23 have a supporting function for the fan wheel 24 rotating about an axis of rotation or for the drive motor 26. The drive motor 26 is fastened in the receptacle 22 which is connected by the first outlet guide vanes 21 with the ventilator housing 14. The ventilator unit can also be designed such that the first outlet guide vanes 21 do not have such a supporting function for the drive motor 26.

The ventilator unit 14 in the described embodiments is advantageously of a one-piece construction. It is particularly advantageous when also the first outlet guide vanes 21 together with the receptacle 22 are formed as one piece with the ventilator housing 14.

The housing however can also be of a multi-part configuration. For example, the ventilator housing 14 can be designed such that the inlet nozzle 15 and the adjoining cylindrical region are formed as one piece with each other while the diffusor 18 with the fastening flange 19 are separately embodied also as one piece. The two parts can then be assembled in a known way for forming the ventilator housing 14.

It is also possible to manufacture the inlet nozzle 15, the cylindrical region 17, and the diffusor 18 as one piece and to attach the first outlet guide apparatus 23 with the first outlet guide vanes 21 and the receptacle 22 as a separate unit to the ventilator housing 14.

The described embodiments illustrate retrofitting already existing ventilator units, provided with the first outlet guide apparatus 23, with a second outlet guide apparatus 2 in order to increase the throw of the ventilator unit. The protective screens 1 according to FIGS. 1 to 7 are provided with the second outlet guide vanes 5 of the second outlet guide apparatus 2. In this case, it is only necessary to attach to the existing ventilator unit such a protective screen in order to mount in this way the second outlet guide apparatus 2 on the ventilator unit. Should the existing ventilator unit already have a protective screen, such a protective screen can be replaced by the protective screen according to FIGS. 1 through 7.

In the embodiment according to FIG. 8, the subsequent expansion of the ventilator unit with the second outlet guide apparatus 2 is possible simply in that the individual second outlet guide vanes 5 are fastened on the first outlet guide vanes 21 of the first outlet guide apparatus 23 of the existing ventilator unit.

In the embodiments according to FIGS. 10 to 13, the second outlet guide apparatus 2 is a component of the auxiliary housing 50 that is attached to the ventilator housing 14 of an existing ventilator unit. The second outlet guide vanes 5 of the second outlet guide apparatus 2 have in this case a supporting function because they connect the receptacle 51 for the drive motor 26 with the auxiliary housing 50.

The specification incorporates by reference the entire disclosure of German priority document 10 2016 007 205.9 having a filing date of Jun. 8, 2016.

While specific embodiments of the invention have been shown and described in detail to illustrate the inventive principles, it will be understood that the invention may be embodied otherwise without departing from such principles.

What is claimed is:

1. A ventilator unit comprising:
a ventilator housing;
at least one ventilator accommodated in the ventilator housing;
a first outlet guide apparatus associated with the ventilator and arranged in the ventilator housing, wherein the first outlet guide apparatus comprises first outlet guide vanes distributed circumferentially;
a second outlet guide apparatus correlated with the first outlet guide apparatus and arranged in an axial direction of the ventilator unit downstream of the first outlet guide apparatus in a flow path of an air stream sucked in by the ventilator;
wherein the second outlet guide apparatus is arranged in an auxiliary housing, wherein the second outlet guide apparatus and the auxiliary housing form a mounting unit fastened to the ventilator housing;
wherein a vane height ratio $H=h_{N1max}/h_{N2max}$ is between 0.2 and 2.5, wherein $h_{N1max}$ is a maximum height of the first outlet guide vanes in the ventilator housing and $h_{N2max}$ is a maximum height of second outlet guide vanes of the second outlet guide apparatus;
wherein, viewed in the axial direction, an attachment region where the auxiliary housing is fastened to the ventilator housing is located between the first outlet guide apparatus and the second outlet guide apparatus.

2. The ventilator unit according to claim 1, wherein the second outlet guide apparatus comprises second outlet guide vanes.

3. The ventilator unit according to claim 2, wherein the second outlet guide vanes are arranged upright in an axial direction of the ventilator unit.

4. The ventilator unit according to claim 2, wherein the second outlet guide vanes are formed of sheet metal parts.

5. The ventilator unit according to claim 2, wherein the second outlet guide vanes are formed of plastic material parts.

6. The ventilator unit according to claim 2, wherein the second outlet guide vanes are planar.

7. The ventilator unit according to claim 2, wherein the second outlet guide vanes each have a leading edge facing the air stream and are extending curved at least in an area of the leading edge.

8. The ventilator unit according to claim 7, wherein the leading edge is straight.

9. The ventilator unit according to claim 7, wherein the leading edge is serrated.

10. The ventilator unit according to claim 1, further comprising a protective screen integrated in the auxiliary housing.

11. A ventilator unit comprising:
a ventilator housing;
at least one ventilator accommodated in the ventilator housing;
a first outlet guide apparatus associated with the ventilator and arranged in the ventilator housing, wherein the first outlet guide apparatus comprises first outlet guide vanes distributed circumferentially;
a second outlet guide apparatus correlated with the first outlet guide apparatus and arranged in an axial direction of the ventilator unit downstream of the first outlet guide apparatus in a flow path of an air stream sucked in by the ventilator;
wherein the second outlet guide apparatus is arranged in an auxiliary housing, wherein the second outlet guide apparatus and the auxiliary housing form a mounting unit fastened to the ventilator housing;
wherein a vane height ratio $H=h_{N1max}/h_{N2max}$ is between 0.2 and 2.5, wherein $h_{N1max}$ is a maximum height of the first outlet guide vanes in the ventilator housing and $h_{N2max}$ is a maximum height of second outlet guide vanes of the second outlet guide apparatus;
wherein, viewed in the axial direction, an attachment region where the auxiliary housing is fastened to the ventilator housing is located between the first outlet guide apparatus and the second outlet guide apparatus;
wherein a protective screen is connected to the auxiliary housing, wherein the second outlet guide apparatus is connected to the protective screen and is arranged inside the auxiliary housing at a side of the protective screen facing the first outlet guide apparatus.

12. The ventilator unit according to claim 11, wherein the second outlet guide apparatus comprises second outlet guide vanes and at least one rod-shaped support, wherein the second outlet guide vanes have a radial length and at least a portion of the radial length is connected to the at least one rod-shaped support.

13. The ventilator unit according to claim 12, wherein the protective screen comprises coaxially positioned rings, wherein the at least one rod-shaped support connects the coaxially positioned rings of the protective screen with each other.

14. The ventilator unit according to claim 11, wherein the second outlet guide apparatus comprises second outlet guide vanes connected to the protective screen, wherein two of the second outlet guide vanes that are positioned opposite each other are formed together as one piece.

15. The ventilator unit according to claim 14, wherein the two second outlet guide vanes that are positioned opposite each other are part of a flat strip.

16. The ventilator unit according to claim 15, wherein the flat strip extends across an entire width or an entire diameter of the protective screen.

17. The ventilator unit according to claim 11, wherein the second outlet guide apparatus comprises second outlet guide vanes connected to the protective screen, wherein the second outlet guide vanes are arranged in pairs of oppositely positioned outlet guide vanes, wherein the pairs of oppositely positioned outlet guide vanes are formed as one piece.

18. The ventilator unit according to claim 17, wherein the pairs of oppositely positioned outlet guide vanes are part of a flat strip, respectively.

19. The ventilator unit according to claim 18, wherein the flat strips are crossing each other at half their length at a crossing point and are connected to each other at the crossing point.

20. The ventilator unit according to claim 18, wherein the flat strips extend across an entire width or an entire diameter of the protective screen.

21. A ventilator unit comprising:
a ventilator housing;
at least one ventilator accommodated in the ventilator housing;
a first outlet guide apparatus associated with the ventilator and arranged in the ventilator housing, wherein the first outlet guide apparatus comprises first outlet guide vanes distributed circumferentially;
a second outlet guide apparatus correlated with the first outlet guide apparatus and arranged in an axial direction of the ventilator unit downstream of the first outlet guide apparatus in a flow path of an air stream sucked in by the ventilator;
wherein the second outlet guide apparatus is arranged in an auxiliary housing, wherein the second outlet guide apparatus and the auxiliary housing form a mounting unit fastened to the ventilator housing;
wherein a vane height ratio $H = h_{N1max}/h_{N2max}$ is between 0.2 and 2.5, wherein $h_{N1max}$ is a maximum height of the first outlet guide vanes in the ventilator housing and $h_{N2max}$ is a maximum height of second outlet guide vanes of the second outlet guide apparatus;
wherein, viewed in the axial direction, an attachment region where the auxiliary housing is fastened to the ventilator housing is located between the first outlet guide apparatus and the second outlet guide apparatus;
wherein the second outlet guide apparatus comprises second outlet guide vanes;
wherein a protective screen comprising coaxially positioned rings is attached to the auxiliary housing, wherein the second guide vanes are connected to the coaxially positioned rings of the protective screen.

* * * * *